H. D. BALCOM.
FISH HOOK.
APPLICATION FILED SEPT. 10, 1910.
990,095.
Patented Apr. 18, 1911.
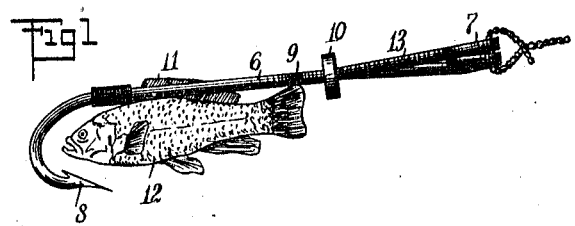
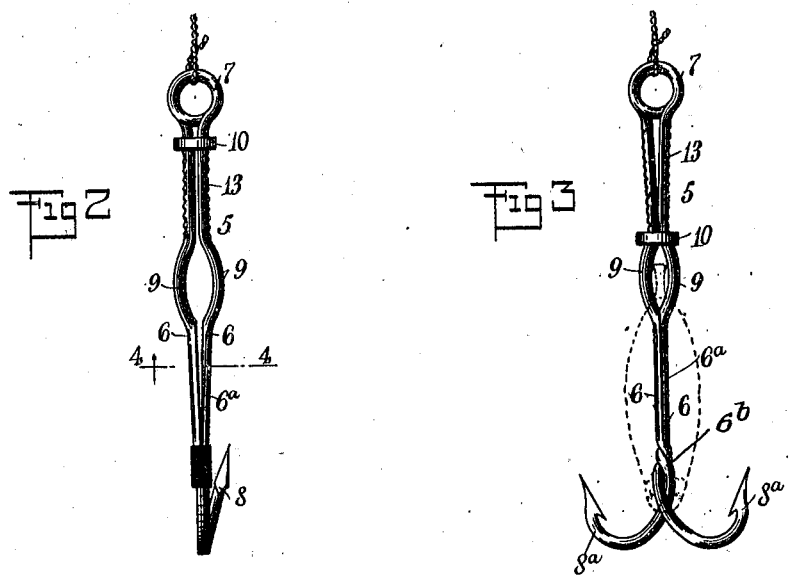
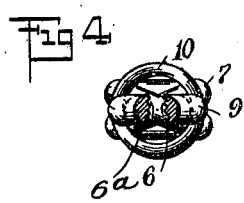
WITNESSES:
INVENTOR
Henry D. Balcom
BY
ATTORNEYS

UNITED STATES PATENT OFFICE.

HENRY D. BALCOM, OF BELFAST, NEW YORK, ASSIGNOR OF ONE-HALF TO FRANK A. HICKS, OF BLACK CREEK, NEW YORK.

FISH-HOOK.

990,095.  Specification of Letters Patent.  Patented Apr. 18, 1911.

Application filed September 10, 1910. Serial No. 581,354.

*To all whom it may concern:*

Be it known that I, HENRY D. BALCOM, a citizen of the United States, and a resident of Belfast, in the county of Allegany and State of New York, have invented a certain new and Improved Fish-Hook, of which the following is a full, clear, and exact description.

My invention relates to fish hooks, and it has for its object to provide a fish hook having a divided shank, the members of which are roughened on their inner sides for gripping the dorsal fin of a minnow, a ring being mounted on the shank, and adapted to be moved along the same for pressing the members against the said dorsal fin.

Still other objects of the invention will appear in the following complete description.

In this specification I will describe the preferred form of my invention, the scope of the invention being pointed out in the appended claims.

Reference is to be had to the accompanying drawings, forming a part of this specification, in which similar characters of reference indicate corresponding parts in all the views, and in which—

Figure 1 is a side elevation of the device, showing the manner of holding the minnow between the members of the shank of the fish hook; Fig. 2 is an enlarged view, showing the members of the shank spaced from each other to permit the introduction of the dorsal fin of a fish therebetween; Fig. 3 is a similar view, showing two barbs secured to the shank, and the ring forced down to hold the members of the shank close together; and Fig. 4 is a sectional view on the line 4—4 of Fig. 2.

By referring to Figs. 1 to 4 of the drawings it will be seen that a wire is bent to form an eye 7, which is continued to form a shank 5, which consists of two members 6, secured together near the barb 8. At a distance below the eye 7 the members 6 are bent outwardly at 9, and a ring 10 is mounted on the members 6 of the shank 5, and is adapted to be slid downwardly and over the projecting portions 9, to press the members 6 close together. Below the projecting portions 9 the inner sides $6^a$ of the members 6 are roughened, so that the dorsal fin 11 of a minnow 12 may be disposed between the members 6 below the projecting portions 9, and be held firmly in place by sliding the ring 10 downward.

In the form of my invention shown in Fig. 3 of the drawings, each of the members 6 terminates in a barbed hook $8^a$, said members being twisted below their roughened surfaces $6^a$ as shown at $6^b$.

In using the invention, the ring 10 is moved upwardly, and the dorsal fin 11 of a minnow is disposed between the roughened surfaces $6^a$ of the members 5, the ring being then pressed downwardly and over the projecting portions 9 of the members 6, to force the members 6 close together, thereby clamping the minnow to the shank of the hook. As the minnow is not cut or bruised in any way, the same minnow may be used for a long period, avoiding the necessity of renewing the bait from time to time.

As will be seen by referring to the drawings, the members 6 of the shank have transverse ridges 13, which prevent the ring 10 from slipping after it has been adjusted in position.

Having thus described my invention, I claim as new and desire to secure by Letters Patent:

1. A fish hook having a divided shank, the members of which are connected together at each end, and a ring mounted on and adapted to move along the shank, for pressing the members toward each other.

2. A fish hook having a divided shank, the members of which have outwardly projecting portions and are connected at each end of the shank, and a ring mounted on and adapted to be moved along the shank and over the projecting portions, for pressing the members toward each other.

3. In a fish hook, a member turned to form an eye, the ends of the member forming a divided shank, having projecting portions, the members of said shank being secured together at the end of the shank, and the terminal at one of the ends being continued to form a barbed hook.

In testimony whereof I have signed my name to this specification in the presence of two subscribing witnesses.

HENRY D. BALCOM.

Witnesses:
E. CHANDLER BRISTOL,
FRANK A. HICKS.